United States Patent

Collins et al.

[11] Patent Number: 5,411,221
[45] Date of Patent: May 2, 1995

[54] SEAT BELT RETRACTOR WITH TENSION RELIEF MECHANISM

[75] Inventors: Cecil A. Collins, Shelby Township, Macomb County; Alfred J. Fisher, III, Grosse Pointe, both of Mich.

[73] Assignee: AlliedSignal, Inc., Morristown, N.J.

[21] Appl. No.: 65,404

[22] Filed: May 24, 1993

[51] Int. Cl.⁶ .............................................. B60R 22/44
[52] U.S. Cl. .................................................. 242/372
[58] Field of Search ......... 242/107, 107.4 R, 107.4 A, 242/107.4 B, 372, 375, 375.1, 375.3; 280/806, 807, 808; 297/474–480

[56] References Cited

U.S. PATENT DOCUMENTS

| | | | |
|---|---|---|---|
| 4,026,494 | 5/1977 | Tanaka | 242/107 |
| 4,108,393 | 8/1978 | Henderson | 242/107 |
| 4,183,476 | 1/1980 | Fohl | 242/107 |
| 4,216,922 | 8/1980 | Weman | 242/107 |
| 4,228,968 | 10/1980 | Jahn | 242/107 |
| 4,342,435 | 8/1982 | Yanagihara | 242/107 |
| 4,382,563 | 5/1983 | Morita et al. | 242/107 |
| 4,483,494 | 11/1984 | Takada | 242/107 |
| 4,494,709 | 1/1985 | Takada | 242/107.6 |
| 4,518,130 | 5/1985 | Gloomis | 242/107 |
| 4,640,472 | 2/1987 | Epple | 242/107 |
| 4,787,569 | 11/1988 | Kanada et al. | 242/107 |
| 4,809,925 | 3/1989 | Takada | 242/107 |
| 4,896,844 | 1/1990 | Gavagan et al. | 242/107.7 |
| 4,907,757 | 3/1990 | Rumpf et al. | 242/107.6 |
| 4,913,372 | 4/1990 | Takada | 242/107 |
| 4,943,011 | 7/1990 | Kitamura et al. | 242/107 |
| 5,072,968 | 12/1991 | Hamaue | 242/107.4 A X |
| 5,080,298 | 1/1992 | Sasaki et al. | 242/107 |
| 5,086,989 | 2/1992 | Kapanka | 242/107 |
| 5,087,075 | 2/1992 | Hamaue | 242/107 X |
| 5,131,594 | 7/1992 | Refior et al. | 242/107 |
| 5,181,739 | 1/1993 | Bauer et al. | 242/107 X |
| 5,195,693 | 3/1993 | Sasaki et al. | 242/107 |
| 5,265,823 | 11/1993 | Doty | 242/107 |
| 5,285,982 | 2/1994 | Kopetzky | 242/107 |

Primary Examiner—John M. Jillions
Attorney, Agent, or Firm—Harness, Dickey & Pierce

[57] ABSTRACT

The present invention is directed to a tension relief mechanism for a safety belt retractor that can be selectively actuated for adjusting the tension exerted on the safety belt. The tension relief mechanism is operable for permitting the seat occupant to selectively vary the loading exerted on a counterspring for counteracting the retractive biasing exerted on the safety belt by the retractor rewind spring. The tension relief mechanism is actuated in response to withdrawal of a predetermined length of the safety belt. Thereafter, the withdrawal and subsequent retraction of an additional incremental length of the safety belt causes loading to be exerted on the counterspring. Thus, the residual tension exerted on the safety belt by the retractor is proportional to the magnitude of the loading applied to the counterspring which, in turn, is proportional to the incremental length of additional safety belt withdrawn following actuation of the tension relief mechanism.

40 Claims, 8 Drawing Sheets

SEAT BELT RETRACTOR WITH TENSION RELIEF MECHANISM

BACKGROUND OF THE INVENTION

The present invention generally relates to an automotive safety belt retractor and, more particularly, to a safety belt retractor of the type having a tension relief mechanism that can be selectively actuated for permitting a seat occupant to adjust the amount of tension exerted upon the safety belt by the retractor.

Modernly, virtually all motor vehicles are equipped with some type of safety belt restraint system for physically restraining the seat occupants when the vehicle is subjected to high rates of deceleration which may occur, for example, during heavy braking or a collision. As is known, conventional safety belt restraint systems include at least one of a lap belt and a shoulder belt, or a combination thereof, which can be withdrawn from a safety belt retractor for latched engagement with an anchored buckle member. Typically, the safety belt retractor is equipped with a rewind spring which exerts a retractive tension force on the belt webbing for taking up any "slack" in the safety belt following latched engagement with the buckle member. As such, the safety belt is normally retained in a "taut" position against the seat occupant for effectively restraining the seat occupant within the vehicle seat.

In an effort to promote increased use of vehicular safety belt restraint systems, it is known to incorporate various "comfort" features into the safety belt retractor. For example, most safety belt retractors employ an inertia-sensitive locking mechanism that is operable for automatically inhibiting withdrawal of the safety belt when the vehicle is subjected to a deceleration exceeding a predetermined level. However, such inertia-sensitive or "emergency locking" retractors permit the safety belt to be freely withdrawn in response to movement of the seat occupant during normal operating circumstances, thereby providing increased comfort and freedom of movement for the seat occupant.

It is also known to incorporate a tension relief mechanism into the safety belt retractor for relieving the pressure exerted upon the seat occupant by the safety belt due to the retractive biasing of the rewind spring. Most commonly, the tension relief mechanism is selectively actuated for introducing a predetermined amount of "slack" into the safety belt following latched engagement with the buckle member. In effect, such tension relief mechanisms are adapted to "lock-out" the rewind spring for eliminating tension on the safety belt so as to prevent retraction of the safety belt to a "taut" position against the seat occupant. Thus, while most conventional tension relief mechanisms are generally satisfactory for their intended purpose, they are incapable of permitting the seat occupant to selectively adjust the magnitude of the tension exerted upon the safety belt with the safety belt in a "taut" position against the seat occupant.

SUMMARY OF THE INVENTION

Accordingly, the present invention is directed to providing a safety belt retractor having means for selectively adjusting the magnitude of the tension exerted on the safety belt. In general, the safety belt retractor of the present invention is equipped with a tension relief mechanism that can be selectively actuated for counteracting the retractive biasing force exerted by the rewind spring. More specifically, the tension relief mechanism is adapted to permit the seat occupant to selectively vary the loading exerted on a counterspring for causing a proportional reduction in the residual or "effective" tension exerted on the safety belt.

As a related object, the safety belt retractor of the present invention includes means for selectively actuating the tension relief mechanism in response to withdrawal of a predetermined length of belt webbing. Thereafter, the withdrawal and subsequent retraction of an additional length of belt webbing is operable for causing the counterspring to be loaded in opposition to the retractive biasing of the rewind spring. As such, the "effective" tension that is exerted on the safety belt by the retractor is proportional to the magnitude of the loading applied to the counterspring which, in turn, is proportional to the length of the additional belt webbing withdrawn.

A further object of the present invention is to provide the tension relief mechanism with means for controllably varying the magnitude of the "effective" tension exerted on the safety belt between a maximum tension limit and a minimum tension limit. The maximum tension limit is established by retaining the counterspring in an "unloaded" condition such that the tension exerted on the safety belt is substantially equal to the retractive force exerted by the rewind spring. To establish the minimum tension limit, the tension relief mechanism is provided with clutch means for inhibiting the counterspring from being loaded in excess of a critical load value. Since the critical load value is preferably set at a value less than the spring force of the rewind spring, a minimum tension limit can be established which ensures retraction of the safety belt to a "taut" position against the seat occupant.

Yet another object of the present invention is to provide a tension relief mechanism that can be readily adapted for use with virtually any spool-type belt retractor, is compact and relatively simple in construction, and provides enhanced comfort and convenience to the seat occupant.

Additional objects, advantages, and features of the present invention will become apparent to those skilled in the art from studying the following written description and appended claims, taken in conjunction with the accompanying drawings.

DETAILED DESCRIPTION OF THE PREFERRED EMBODIMENT

The present invention is directed to an improved comfort mechanism for use in safety belt retractors of the type which can be integrated into the safety belt restraint system of virtually any motor vehicle. In general, the improved comfort mechanism of the present invention is a tension relief mechanism that is operable for permitting the seat occupant to selectively adjust (i.e., vary) the magnitude of the tension loading exerted on a safety belt. Thus, it is to be understood that while various embodiments of the present invention are hereinafter disclosed in association with a particular safety belt retractor, such embodiments are merely exemplary representations of the types of environments to which the invention is readily applicable. For example, while the tension relief mechanism of the present invention is hereinafter shown in conjunction with a single belt retractor, it is equally applicable for use with dual belt retractors.

Figure 1:
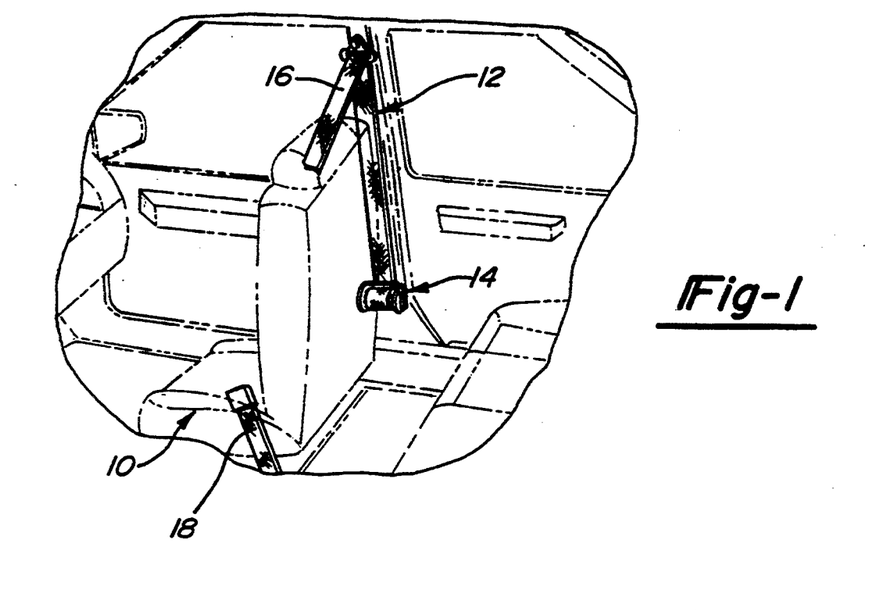
FIG. 1 is a pictorial view of the interior passenger compartment for an exemplary motor vehicle showing the safety belt retractor of the present invention incorporated into a safety belt restraint system.

Referring now to the Figures, and in particular to FIG. 1, a portion of the interior passenger compartment of an exemplary motor vehicle is shown to include a seat 10 and a safety belt restraint system 12. Restraint system 12 includes a safety belt retractor 14 mounted to a vertical pillar on the interior of the vehicle in a conventional manner and a safety belt 16 which projects from retractor 14. Safety belt 16 is adapted to extend across the chest and/or lap of a seat occupant for latched engagement with an anchored belt buckle 18.

Figure 2:
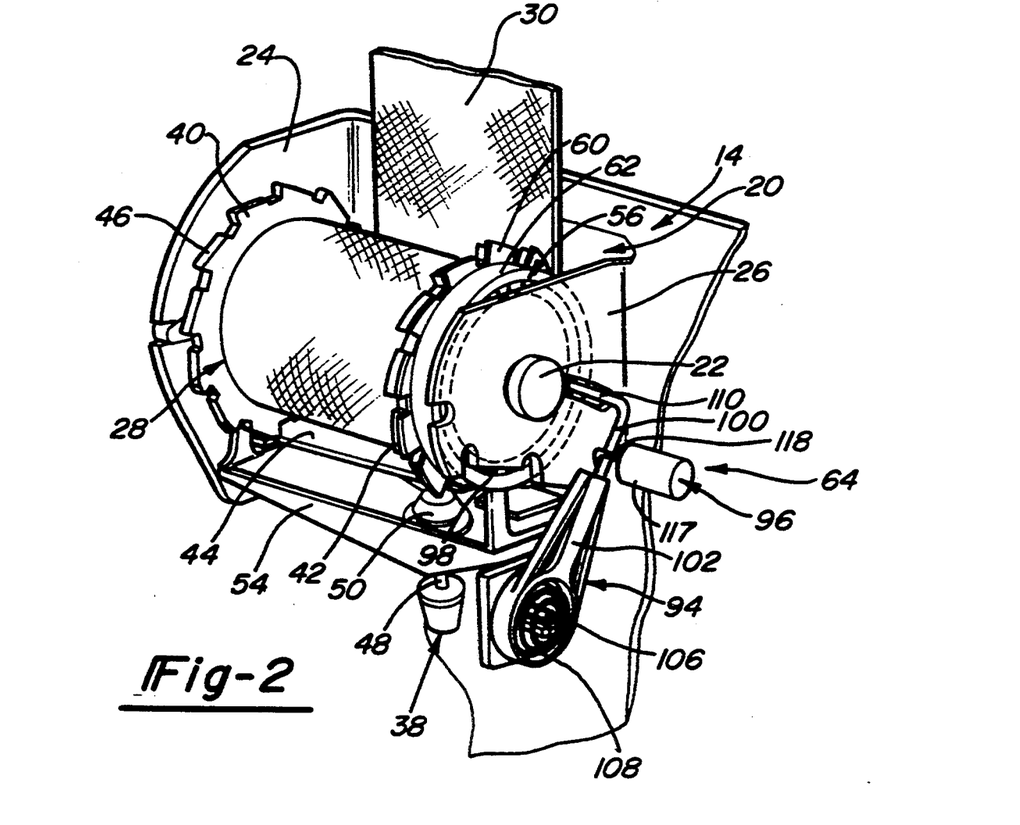
FIG. 2 is a partially cut-away perspective view of the safety belt retractor shown in FIG. 1 equipped with an improved tension relief mechanism embodying the novel principles and features of the present invention.
Figure 3:
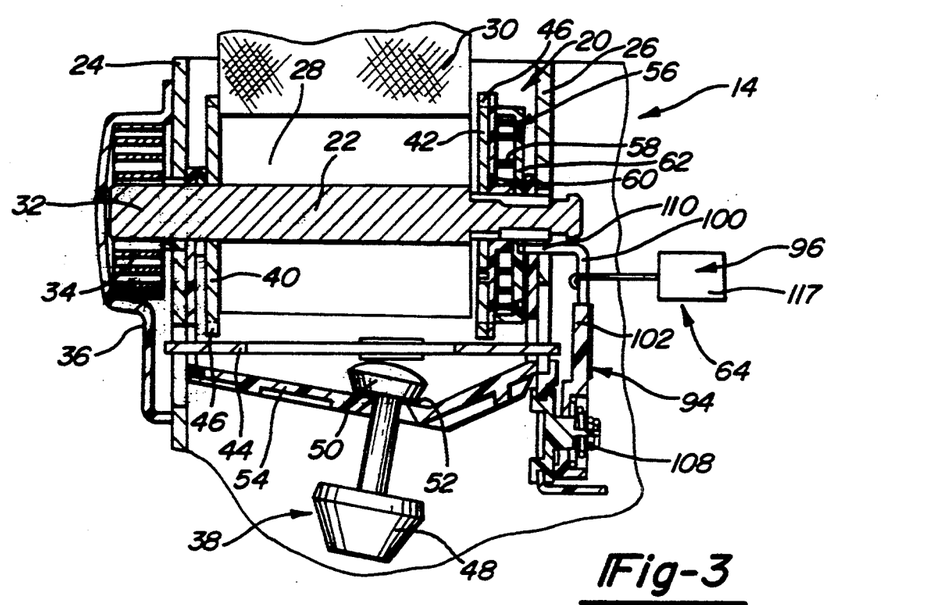
FIG. 3 is a vertical cross-sectional view of the safety belt retractor shown in FIG. 2.
Figure 4:
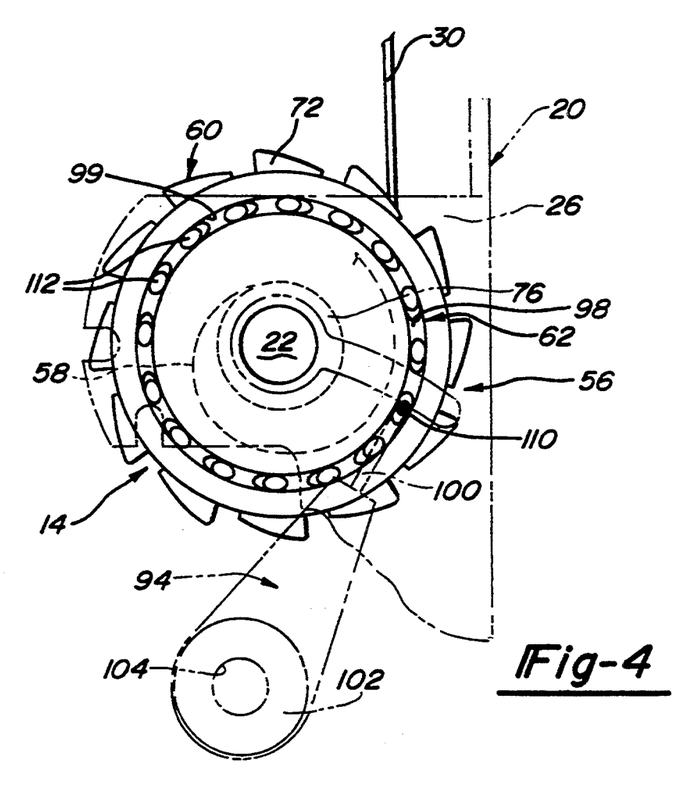
FIG. 4 is a diagrammatic side view of the safety belt retractor shown in FIG. 2 illustrating the relative position of various components associated with the tension relief mechanism of the present invention.

With particular reference now to FIGS. 2 through 5, safety belt retractor 14 of the present invention is shown to include a U-shaped frame member 20 having a spindle 22 journaled between its two outwardly extending side plates 24 and 26. A spool 28 is coaxially affixed to spindle 22 between side plates 24 and 26 such that spool 28 commonly rotates with spindle 22. As will be appreciated, spool 28 generally serves the purpose of storing any belt webbing 30 when safety belt 16 is taken up by retractor 14 and for paying out seat belt webbing 30 when the seat occupant withdraws safety belt 16 from retractor 14. As best seen in FIG. 3, one end 32 of spindle 22 extends through side plate 24 of frame member 20 and has one end of a rewind spring 34 affixed thereto. The opposite end of rewind spring 34 is affixed to a stationary spring cover 36 that is retained on side plate 24 of U-shaped frame 20. Accordingly, as safety belt webbing 30 is withdrawn from retractor 14, spindle 22 rotates in a first direction (i.e., counterclockwise) relative to spring cover 36, thereby tensioning rewind spring 34 and storing a portion of the energy exerted to withdraw belt webbing 30. The tensioned rewind spring 30 exerts a retractive force upon spindle 22 and, in turn, spool 28 for normally urging spool 28 to rotate in a second direction (i.e., clockwise) for rewinding belt webbing 30 onto spool 28. Thus, retractor 14 serves to automatically take up any excess belt webbing 30 (i.e., "slack") by continuously applying the retractive force on webbing 30 which, in turn, causes safety belt 16 to be tautly positioned against the occupant's body.

As a comfort feature, it is known to provide safety belt retractors with means for permitting the seat occupant to move while still being restrained by the safety belt. For example, if the occupant were seated in a normal driving position with belt webbing 30 tensioned against his/her body, it would be desireable to permit the occupant to lean forward for manipulating objects near the dash. However, if the vehicle were to rapidly decelerate, it is desirable to automatically lock safety belt retractor 14 so as to prevent subsequent withdrawal of safety belt 16 therefrom, thereby restraining the occupant with respect to the vehicle. To this end, safety belt retractor 14 is equipped with an inertia-sensitive type "emergency locking" mechanism 38. Locking mechanism 38 is shown to include a pair of toothed sprockets 40 and 42 fixed to opposite ends of spool 28 and a locking bar 44 that is supported for pivotable movement between a "normal" position disengaged from sprocket teeth 46 and a "locked" position of engagement with sprocket teeth 46. In addition, locking mechanism 38 also includes an inertia pendulum 48 having an actuation head 50 which normally rests in a socket 52 of a pendulum support member 54.

In the event that the vehicle is exposed to a deceleration above a predetermined level, pendulum 48 is pivotably displaced for causing actuation head 50 to act upon locking bar 44, thereby urging locking bar 44 into locked engagement with teeth 46 of sprockets 40 and 42. In the "locked" position, locking bar 44 inhibits spool 28 from rotating in the first direction so as to prevent the continued payout of belt webbing 30 from retractor 14. On the other hand, while locking bar 44 is in the "normal" disengaged position, spool 28 is free to payout belt webbing 30 as described above. It will be appreciated that emergency locking mechanism 38 is merely exemplary in nature and that safety belt retractor 14 can be equipped with any suitable emergency locking device known in the art.

According to a primary feature of the present invention, safety belt retractor 14 is equipped with a unique tension relief mechanism 56 that is operable for permitting the seat occupant to adjust the magnitude of the tension loading exerted upon safety belt 16. In its most basic sense, tension relief mechanism 56 can be selectively actuated for counteracting the retractive biasing force exerted on belt webbing 30 by rewind spring 34 so as to reduce the tension loading exerted on safety belt 16. To provide means for counteracting the retractive biasing of rewind spring 34, tension relief mechanism 56 includes a driven member 60 fixed for rotation with spool 28, a clutch member 62 and a counterspring 58 interconnecting clutch member 62 to driven member 60. Tension relief mechanism 56 also includes means for selectively inhibiting rotation of clutch member 62 such that continued rotation of driven member 60 with spool 28 causes a load to be applied to counterspring 58. As will be detailed, the magnitude of the load applied to counterspring 58 is proportional to the amount of relative rotation between driven member 60 and clutch member 62.

Tension relief mechanism 56 also includes an actuation mechanism 64 that is operable in a first state to permit concurrent bi-directional rotation of clutch member 62 with driven member 60, whereby tension relief mechanism 56 is considered to be in a "non-actuated" mode. In this non-actuated mode, the spring force of counterspring 58 is adapted to permit it to transfer rotational movement from driven member 60 to clutch member 62 while being maintained in a relaxed or "unloaded" condition. However, upon the withdrawal of a predetermined length of belt webbing 30, actuation mechanism 64 is automatically shifted into a second state wherein clutch member 62 is permitted to rotate concurrently with driven member 60 in the first direction but is inhibited from subsequently rotating therewith in the second direction. In this second state, tension relief mechanism 56 is considered to be in an "actuated" mode. Thus, once more than the predetermined length of belt webbing 30 has been withdrawn from retractor 14, any subsequent retraction of belt webbing 30 in response to rotation of spool 28 in the second direction results in relative rotation between driven member 60 and clutch member 62. Such relative rotation causes counterspring 58 to be tensioned for generating a counteractive force on spool 28 which opposes the retractive force exerted on spool 28 by rewind spring 34 for establishing an "effective" tension loading which is exerted on safety belt 16. Thus, the "effective" tension loading has a residual value that is less than the full retractive force exerted by rewind spring 34.

Figure 5:
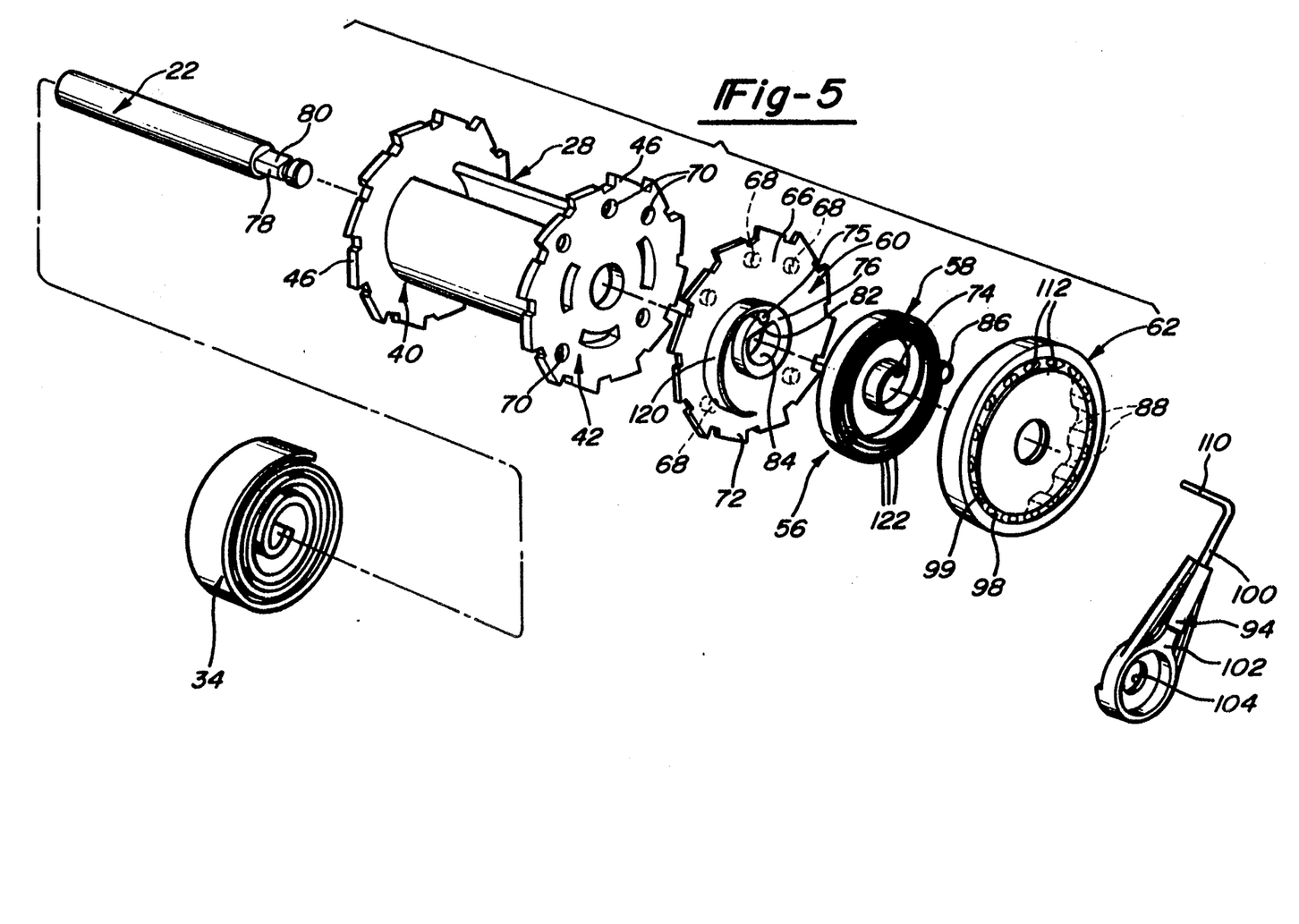
FIG. 5 is an exploded perspective view of a portion of the safety belt retractor showing the components associated with the tension relief mechanism of the present invention in greater detail.

With particular reference now to FIG. 5, the various components of tension relief mechanism 56 are more clearly shown. Driven member 60 is preferably made of a rigid plastic material and has a plate-like segment 66 which generally corresponds in shape to sprocket member 42 on spool 28. More specifically, plate segment 66 of driven member 60 is adapted to abut and be rigidly affixed to sprocket 42 by inserting a plurality of pin fasteners 68 into corresponding apertures 70 formed in sprocket 42. Driven member 60 is mounted to sprocket 42 such that its teeth 72 are aligned with sprocket teeth 46. Preferably, teeth 72 on driven member 60 extend slightly radially beyond teeth 46 on sprocket 42 and are primarily used to prevent locking bar 44 from generating an excessive amount of noise as it ratchets across teeth 46 of sprockets 40 and 42. While disclosed as a separate component, it is contemplated that driven member 60 could alternatively be integrated into sprocket 42.

As noted, counterspring 58 couples driven member 60 to clutch member 62 such that relative rotation therebetween in response to rotation of spool 28 in the first direction causes counterspring 58 to be tensioned (i.e., "loaded") while relative rotation in response to rotation of spool 28 in the second direction results in counterspring 58 being relaxed ("unloaded"). At its inner end portion 74, counterspring 58 is retained in a socket 75 formed in a central arbor segment 76 which extends axially from plate segment 66 of driven member 60. This arbor segment 76 concentrically surrounds a portion 78 of spindle 22 and is keyed thereto by means of a flat 80 on spindle 22 that mates with a flat 82 formed on the inside diameter of a central bore 84 in arbor segment 76. In addition, a dog 86 is formed at the outer end portion of secondary spring 58 which is adapted to engage one of a plurality of grooves 88 defined by an inner toothed surface 90 formed in a spring retainer segment 92 of clutch member 62. By engaging one of grooves 88, dog 86 maintains the outer end of counterspring 58 in a held relationship with respect to clutch member 62.

To provide means for selectively actuating tension relief mechanism 56, actuation mechanism 64 is shown to include a follower 94 and an actuator 96. In general, follower 94 is a spring-biased stylus which is adapted to move between positions of engagement and disengagement relative to a track 98 formed in a recessed annular channel 99 in clutch member 62. As best shown in FIGS. 2, 3 and 5, stylus 94 includes an arm 100 that extends from a spring housing 102. Spring housing 102 has an aperture 104 through which a pivot post 106 formed on U-shaped frame 20 extends. A conical torsion spring 108 is connected between pivot post 106 and spring housing 102 for normally biasing stylus 94 in an axially inward direction toward track 98 in clutch member 62. As will be described, actuator 96 is operable for permitting torsion spring 108 to bias the distal end of stylus tip 110 to ride on track 98 upon actuation of tension relief mechanism 56. Likewise, actuator 96 is further operable for moving the distal end of stylus tip 110 out of engagement with track 98 when tension relief mechanism 56 is in its non-actuated condition.

As best seen from FIGS. 5 through 8, track 98 includes a series of sequential camming detents 112. In general, each detent 112 has a ramped camming surface 114 that is shaped to permit the end of stylus tip 110 to "ratchet" thereover upon rotation of spool 28 in the first direction (i.e., upon withdrawal of belt webbing 30 following actuation of tension relief mechanism 56). As such, clutch member 62 is permitted to concurrently rotate with spool 28 via its connection to driven member 60 through counterspring 58. During such concurrent rotation of the components, no relative rotation occurs between driven member 60 and clutch member 62 such that counterspring 58 remains in its "unloaded" relaxed condition. On the other hand, when spool 28 is subsequently rotated in the second direction (i.e., during retraction of webbing 30), the distal end of stylus tip 110 drops into one of detents 112 and engages a stepped surface 116, thereby locking clutch member 62 with respect to stylus 94. Consequently, clutch member 62 is effectively coupled to a portion of U-shaped frame 20 via stylus 94, thereby preventing clutch member 62 from rotating with spool 28 and driven member 60 in the second direction. As such, relative rotation occurs between driven member 60 and clutch member 62 which causes counterspring 58 to be tensioned, thereby providing the opposing spring force necessary to counteract the retractive force exerted on webbing 30 by rewind spring 34.

Note that in FIGS. 2 and 3, actuator 96 is shown as a solenoid device 117 having a movable lever arm 118 for selectively controlling the engagement and disengagement of stylus 94 with recessed track 98. More particularly, when solenoid 117 is energized, lever arm 118 is retracted for lifting stylus 94 out of engagement with track 98, and when solenoid 117 is non-energized, lever arm 118 is extended for permitting conical spring 108 to bias stylus 94 into engagement with track 98. As noted, the control of actuator 96 is predicated on the length of webbing 30 that is withdrawn from retractor 14. When less than the predetermined length of webbing 30 is withdrawn, solenoid 117 is maintained in its energized condition to retain tension relief mechanism 56 in its "non-actuated" mode. However, upon more than the predetermined length of webbing 30 being withdrawn, solenoid 117 is de-energized to place tension relief mechanism 56 in its "actuated" mode. In order to detect the amount of webbing 30 which has been withdrawn from retractor 14, any one of a number of otherwise conventional indicating mechanisms (not shown), including counters and/or timers can be utilized for sending an appropriate electrical signal to solenoid 117 for controlling energization thereof. While this embodiment discloses utilization of an electrically-controlled actuator 96, one of ordinary skill in the art would recognize that any number of commonly known mechanical actuators could also be utilized to selectively control movement of stylus 94. For example, a planetary gear/-camming mechanism similar to that disclosed in commonly owned U.S. Pat. No. 4,555,075 issued Nov. 26, 1985 to Schmidt, et al could be used for mechanically moving stylus 94 between its two distinct mode positions. Another example of a mechanism that could be utilized for shifting a device between various mode positions when a certain length of webbing has been withdrawn from the retractor is disclosed in commonly owned U.S. Pat. No. Re. 33,679 reissued on Sep. 3, 1991. This patent discloses a switching lever actuated by portions of the webbing itself.

In accordance with another feature of the present invention, a brake member 120 extends from arbor segment 76 of driven member 60 to prevent the tensioned counterspring 58 from damaging itself. Preferably, brake member 120 extends initially in a generally tangential direction relative to the outer circumference of arbor segment 76. As brake member 120 extends further from arbor segment 76, it curves generally in the same direction as secondary spring 58. FIGS. 9–15 illustrate various embodiments of brake member 120 which is, in effect, interleaved within intermediate coil portions 122 of counterspring 58. Accordingly, as counterspring 58 is permitted to uncoil from a tensioned "loaded" state (FIG. 9) toward its relaxed "unloaded" state (FIGS. 11), coil portions 122 of secondary spring 58 radially expand, thereby engaging brake member 120 as shown in FIGS. 10. When coil portions 122 expand and engage brake member 120, brake member 120 exerts a reactive force against counterspring 58 for impeding the speed with which counterspring 58 uncoils. Thus, counterspring 58 is prevented from violently uncoiling and inverting about arbor segment 76.

Figure 9:
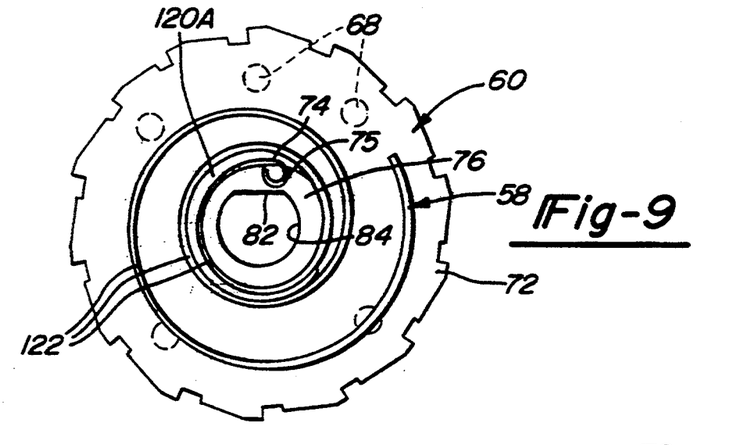
FIG. 9 is a diagrammatic plan view of a driven member and a counterspring that are associated with one embodiment of the tension relief mechanism, and further illustrating the counterspring in a tensioned "loaded" position.
Figure 10:
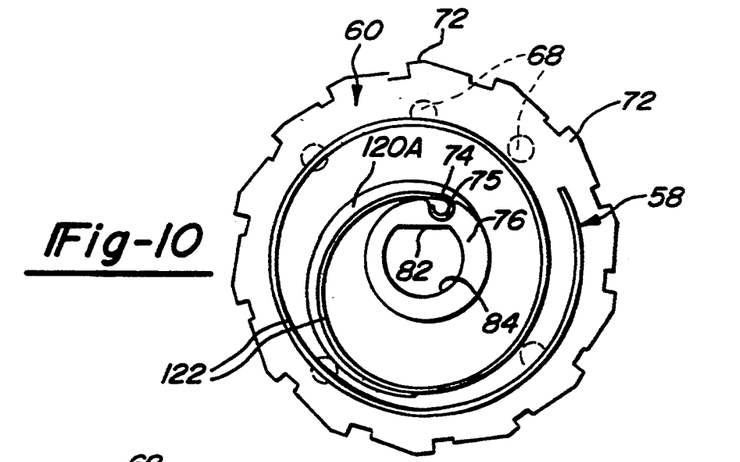
FIG. 10 is a diagrammatic plan view, similar to FIG. 9, illustrating movement of the counterspring as it uncoils from its tensioned "loaded" position toward a relaxed "unloaded" position, and further illustrating the counterspring engaging a brake member extending integrally from an arbor portion of the driven member.
Figure 11:
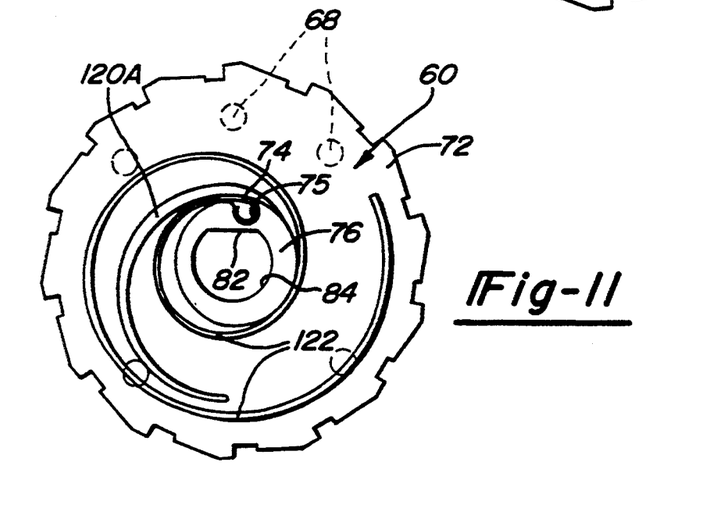
FIG. 11 is a diagrammatic plan view, similar to FIGS. 9 and 10, showing the counterspring in its relaxed "unloaded" position.
Figure 12:
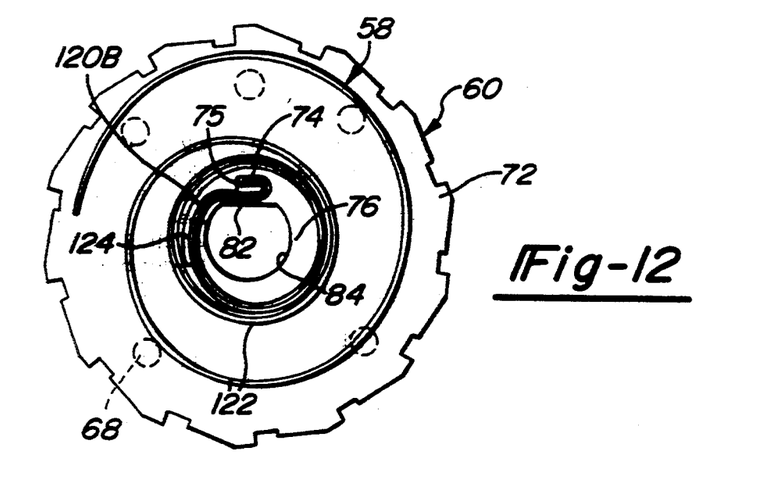
FIGS. 12 through 14 are diagrammatic plan views which show an alternative embodiment for the driven member and the counterspring of the tension relief mechanism.
Figure 13:
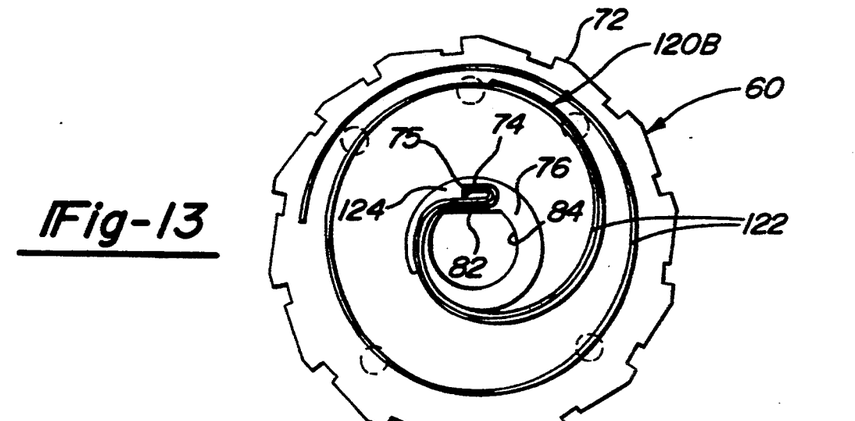
Figure 14:
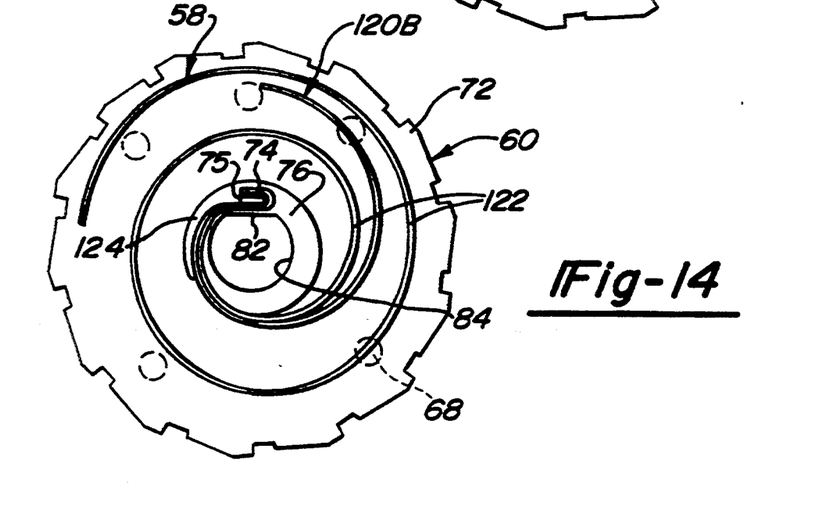
Figure 15:
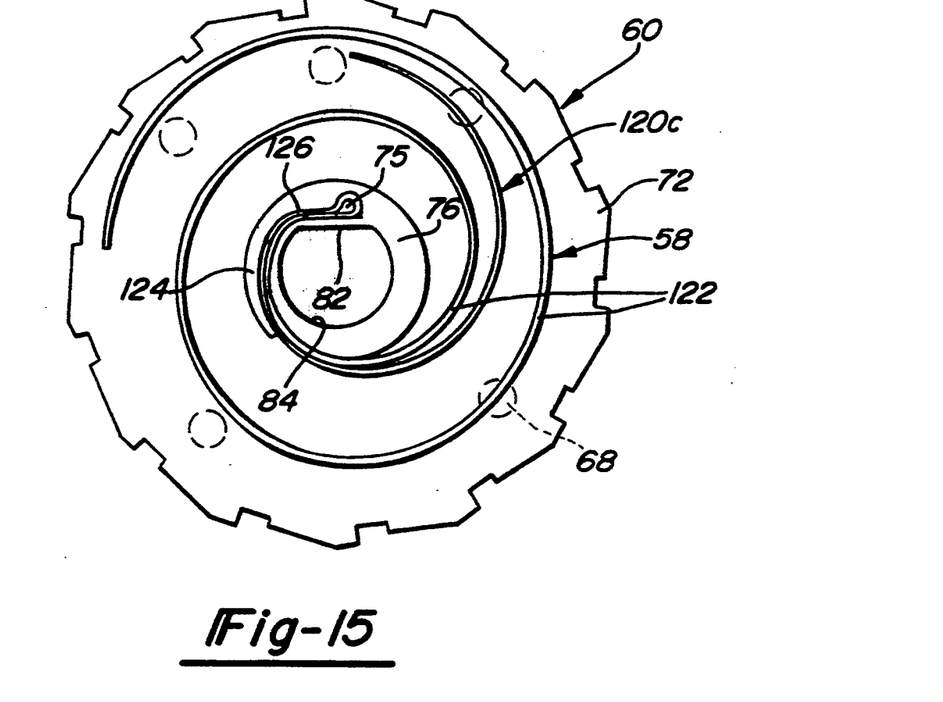
FIG. 15 is a diagrammatic plan view of yet another alternative embodiment for the driven member and counterspring which shows the brake member as a doubled-back extension of the counterspring.

FIGS. 9 through 11 illustrate one preferred embodiment of brake member 120 which is substantially identical to that shown in FIG. 5. This particular brake member, identified by reference numeral 120A, is made of a plastic material and integrally extends from arbor segment 76 of driven member 60. Preferably, brake member 120A is flexible and resilient such that it can be easily interleaved within coil portions 122 of counterspring 58. In addition, it is desirable that brake member 120A have energy absorbing characteristics such that the energy associated with the unwinding of counterspring 58 can be absorbed. In addition, FIGS. 12 through 14 disclose a second embodiment of a brake member 120B. This particular embodiment utilizes a flexible metallic band as brake member 120B which extends between the outer peripheral surface and a short outer flap 124 of arbor segment 76 and is interleaved with coils 122 of counterspring 58 in a similar manner as that previously described. Finally, FIG. 15 illustrates another embodiment of a brake member 120C where the inner end of counterspring 58 is doubled-over and affixed to arbor segment 76 of driven member 60. The doubled-over portion 126 extends between flap 124 and the outer peripheral of arbor segment 76 and is interleaved between coils 122 of counterspring 58 in the same manner as the two above-described embodiments of brake members 120A and 120B.

Figure 6:
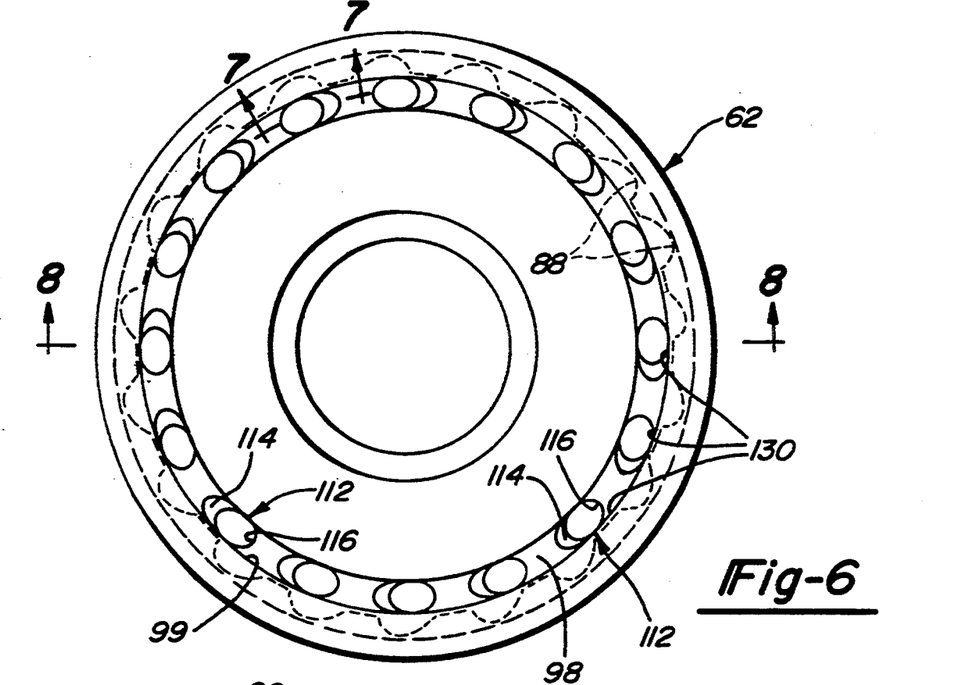
FIG. 6 is an end view of a clutch member associated with the tension relief mechanism shown in FIG. 5.
Figure 7:
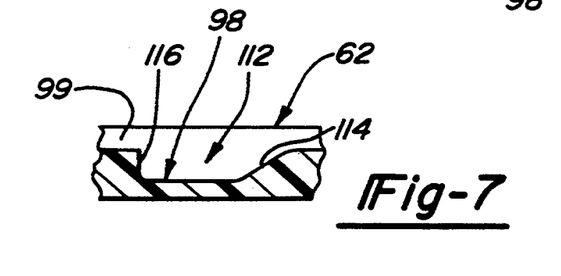
FIG. 7 is a cross-sectional view taken along section 7—7 in FIG. 6.
Figure 8:
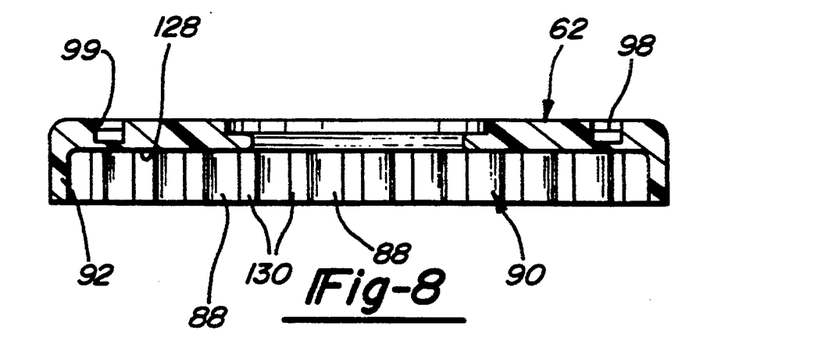
FIG. 8 is a cross-sectional view taken through section 8—8 in FIG. 6.

Another unique feature of the present invention that prevents counterspring 58 from becoming damaged as a result of over-tensioning involves the provision for a clutching arrangement between dog 86 at the outer end of counterspring 58 and grooves 88 in clutch member 62. Accordingly, the inherent tension within counterspring 58 causes dog member 86 to be biased radially outwardly, thereby causing dog member 86 to be biased into engagement with one of grooves 88 for coupling the outer end of counterspring 58 to clutch member 62 as described above. As best shown in FIGS. 6 and 8, grooves 88 are separated by a series of raised lands 130 to define the continuous tooth-like surface 90. The contour of surface 90 is operable to prevent dog member 86 from disengaging a groove 88 until a maximum value for the tension in counterspring 58 is exceeded. Once this maximum tension level in counterspring 58 is exceeded, dog member 86 disengages groove 88 by camming radially inwardly along surface 90 until the tension of counterspring 58 pulls dog member 86 circumferentially into an adjacent groove 88. If the tension on counterspring 58 is still greater than the maximum amount, dog member 86 will again disengage groove 88 and move to the next groove in sequence. This sequential "ratcheting" action continues until dog member 86 engages a groove 88 where the tension on counterspring 58 is less than the maximum value. Preferably, the maximum tension level for counterspring 58 is set to prevent counterspring 58 from excessively negating the retractive force exerted upon webbing 30 by rewind spring 34. In other words, tension relief mechanism 56 is operable to place an upper limit on the amount of tension that can be stored in counterspring 58. Thus, counterspring 58 is only capable of applying the maximum amount of opposing counteractive force to spool 28 for negating a portion of the retractive force exerted by rewind spring 34, thereby ensuring that the residual "effective" tension loading applied by retractor 14 on safety belt 16 has a minimum value which is sufficient to maintain webbing 30 tautly (i.e., without "slack") against the seat occupant.

In operation, tension relief mechanism 56 of the present invention is "actuated" by withdrawing enough belt webbing 30 from retractor 14 to signal actuator 96 to shift into the mode permitting conical tension spring 108 to bias stylus 94 into engagement with track 98. However, before this predetermined length of webbing 30 has been withdrawn, tension relief mechanism 56 is maintained in its "non-actuated" mode, thereby retaining actuator 96 in the state preventing stylus 94 from engaging track 98. Preferably, tension relief mechanism 56 is shifted into its "actuated" mode when enough webbing 30 has been withdrawn to buckle safety belt 16 in an operative position without an occupant in the seat. This ensures that enough webbing 30 will be withdrawn to engage stylus 94 when safety belt 16 is buckled in an operative position around even the smallest occupant.

After stylus 94 is permitted to engage track 98, the occupant can continue to withdraw webbing 30 such that clutch member 62 continues to rotate in the first direction with spool 28 since stylus 94 ratchets over the sequential series of detents 112. Once enough webbing 30 has been withdrawn from retractor 14 to buckle the occupant, the maximum residual tension loading for tension relief mechanism 56 is established. Thereafter, the occupant may selectively withdraw an additional length of belt webbing 30 to selectively reduce the tension exerted on safety belt 16. Once again, since spool 28 continues to rotate in the first direction during the withdrawal of the additional length of webbing 30, clutch member 62 continues to rotate in cooperation therewith.

After an additional length ($L_1$) of webbing 30 has been withdrawn from retractor 14, the occupant simply allows this additional webbing 30 to be taken up by safety belt retractor 14. When retractor 14 initially begins to take up this additional webbing 30, clutch member 62 reverses rotation and also begins to rotate in the second direction. Shortly thereafter however, the distal end of stylus tip 110 drops into the first available detent 112 and engages its stepped surface 116. Once engaged with stepped surface 116, clutch member 62 is prevented from rotating upon spindle 22. Thus, as rewind spring 34 continues to cause spool 28 and driven member 60 to rotate in the second direction, relative rotation between driven member 60 and clutch member 62 creates increased tension loading in counterspring 58. By creating this tension, counterspring 58 is effectively storing a portion of the energy used to withdraw the additional length of webbing ($L_1$) from retractor 14.

Once retractor 14 has taken up all of the additional webbing 30, safety belt 16 is in a "taut" position relative to the occupant. With safety belt 16 in this position, the occupant is restrained within the vehicle seat and the retractive force exerted on spool 28 by rewind spring 34 is counteracted by both the reactive force of buckled safety belt 16 and the opposing force exerted upon spool 28 by counterspring 58. Generally, in prior art retractors, the retractive force exerted on the spool by the rewind spring is balanced only by the reactive force of the buckled webbing. Thus, a strong rewind spring typically generates a significant tension loading on the webbing which, in turn, imparts an uncomfortable pressure on the occupant's body. Since the present invention balances the retractive force of rewind spring 34 against the reactive force of buckled safety belt 16 and the opposing force created by counterspring 58, the residual or "effective" retractive tension loading exerted on safety belt 16 is reduced. As a result, the pressure exerted upon the occupant's body is also reduced in proportion to the counteractive force exerted on spool 28 due to the tension in counterspring 58.

Since the amount of energy stored in counterspring 58, and therefore the amount of pressure exerted upon the occupant, is proportional to the length of the additional webbing 30 withdrawn from retractor 14, the occupant can easily control the amount of the counteractive force generated by counterspring 58. For example, if the occupant withdraws an additional length of webbing ($L_1$) and then allows that webbing to be retracted, a corresponding counteractive force ($F_1$) will be generated. This counteractive force ($F_1$) directly reduces the retractive force exerted upon webbing 30 by rewind spring 34. If the belt pressure upon the occupant is still greater than that desired despite counteractive force ($F_1$), the occupant can incrementally increase the counteractive force by withdrawing the initial additional length of webbing ($L_1$) plus a second additional length ($L_2$) and then allowing all of the webbing ($L_1 + L_2$) to be taken up by retractor 14. This will create a cumulative counteractive force equal to ($F_1 + F_2$), where ($F_2$) is the incremental counteractive force created by withdrawing the second additional length ($L_2$). If the pressure upon the occupant is still greater than desired, the occupant can continue to withdraw even more webbing 30 from retractor 14, thereby creating an even larger counteractive force until a comfortable pressure is achieved.

In order to prevent an occupant from creating an excessive counteractive force by over-tensioning counterspring 58, the above-noted clutching arrangement is provided. Thus, if an occupant withdraws too much additional webbing 30 from retractor 14, thereby causing the tension within counterspring 58 to exceed a predetermined maximum amount, dog member 86 will sequential 14 disengage (i.e., ratchet) from grooves 88 until the tension within counterspring 58 is less than the predetermined maximum amount. Accordingly, the clutching arrangement sets a limit for the maximum tension within counterspring 58 and, consequently, defines a minimum tension load that can be exerted on safety belt 16 by retractor 14.

If the occupant desires the maximum amount of retractive tensile force against his/her body, the occupant would simply withdraw just enough webbing 30 to buckle their body in a normal position. In this instance, the pressure felt against the body of the occupant would be almost entirely due to the retractive force exerted on spool 28 by rewind spring 34. If the occupant desires to cancel the tension relief feature to eliminate the reduced tension in safety belt 16, stylus 94 must be disengaged from track 98, thereby allowing tensioned counterspring 58 to return to its relax state. This can be accomplished in a number of ways, including simply unbuckling safety belt 16 from its operative position and allowing enough webbing 30 to be taken up by retractor 14 until actuator 96 causes stylus 94 to disengage track 98.

Once the occupant is buckled and webbing 30 is in an operative position, counterspring 58 acts as a memory device. In other words, once the occupant has comfortably set the tension in safety belt 16, counterspring 58 allows the occupant to lean forward, thereby withdrawing webbing 30 from retractor 14 without affecting the previously selected tensile loading. So long as the occupant does not withdraw more webbing 30 than the additional length of webbing 30 originally withdrawn to set tension relief mechanism 56, the retractive tension will return to the occupant's previously selected amount when the occupant returns to a normal seated position.

Figure 16:
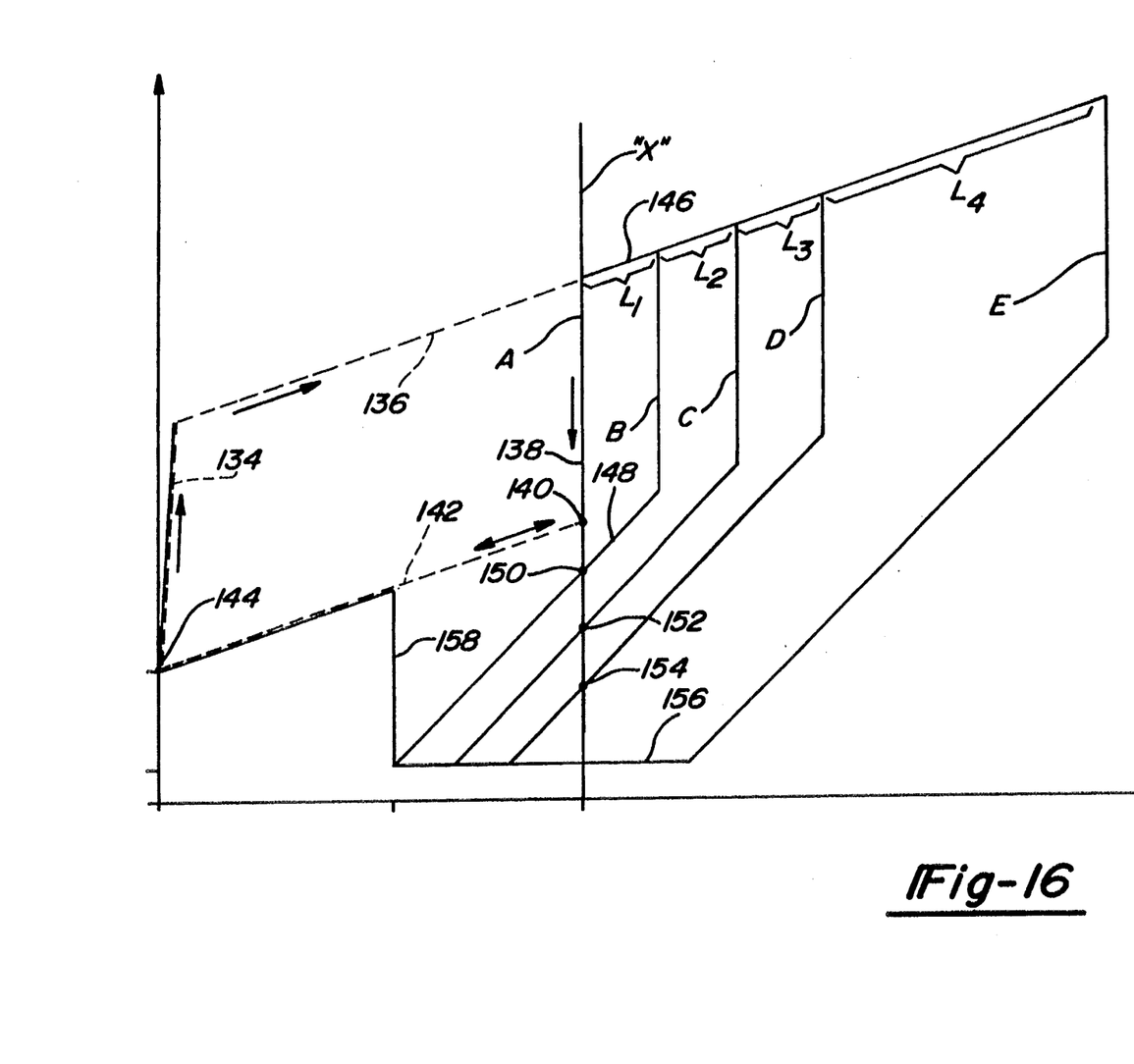
FIG. 16 graphically illustrates exemplary relationships between the "effective" tension exerted upon the safety belt as plotted against the amount of webbing withdrawn from the safety belt retractor.

In order to better illustrate the advantageous effects of tension relief mechanism 56 of the present invention, FIG. 16 illustrates a number of exemplary curves representing the amount of tension on safety belt 16 as plotted against the length of webbing 30 withdrawn from retractor 14. The curve indicated at A, shown as a dashed line, is representative of a conventional retractor without tension relief mechanism 56 of the present invention. As can be seen from this curve, when webbing is initially withdrawn from its fully retracted position, there is a sudden increase of tension before the webbing begins to payout from the retractor. This initial steep portion 134 of curve A represents the initial force applied by pulling on the webbing in order to overcome the static frictional forces throughout the safety belt system. Thereafter, the tension exerted upon the belt webbing steadily increases as it is withdrawn from the retractor. The slope of portion 136 of curve A is generally representative of the spring constant for the rewind spring. Moreover, the magnitude of the forces for portion 136 of curve A represents the amount of force required to overcome the rewind spring in addition to the amount of force necessary to overcome the dynamic frictional bias within the safety belt system. After enough belt webbing has been withdrawn from the retractor to buckle the occupant in an operative position and the occupant stops withdrawing webbing, the tensile force on the webbing drops suddenly. Portion 138 of curve A illustrates this sudden drop which continues until the tension in the webbing is equal to an amount representing only the force exerted by the rewind spring. At this point, the safety belt is taut against the seat occupant as defined by the line identified as imaginary axis "X". Since the webbing is no longer being withdrawn from the retractor, the force necessary to overcome the frictional bias of the safety belt system is eliminated and only the force of the rewind spring remains, its magnitude being indicated at point 140. Thereafter, when the occupant unbuckles the safety belt from its buckled position and allows the retractor to take up the webbing, the amount of tension thereon gradually decreases as the webbing is taken up by the rewind spring and the rewind spring relaxes. Eventually, this portion 142 of curve A terminates at the point of beginning 144 when the safety belt is fully retracted onto the retractor. In addition, curve A is also representative of retractor 14 of the present invention when tension relief mechanism 56 is in its "non-actuated" mode. As such, it is substantially the full force of rewind spring 34 (point 140) which tensions safety belt 16 against the occupant.

With particular reference to curves B through E, a family of curves are shown which depict the withdrawal of various additional lengths of webbing 30 from retractor 14 beyond the amount necessary to actuate tension relief mechanism 56. For example, as shown by portion 146 of curve B, a small amount of additional length ($L_1$) of webbing 30 is withdrawn and subsequently taken up by retractor 14. Curve B is similar to curve A except when retractor 14 begins to take up the additional length ($L_1$) of webbing 30. At this portion 148 of curve B, counterspring 58 is being tensioned, thereby creating the counteractive force which opposes the retractive force of rewind spring 34. Thus, the amount of force exerted on webbing 30 by rewind spring 34 decreases more rapidly upon webbing 30 being taken up by retractor 14, When the additional length ($L_1$) of webbing 30 is taken up and safety belt 16 is taut against the occupant, the amount of tension exerted on safety belt 16 is less than that of curve A, as indicated at point 150. Curves C and D respectively illustrate that when more incremental lengths of webbing ($L_2$) and ($L_3$) are withdrawn, the tension on safety belt 16 in the operative belted position is still further reduced, as indicated by points 152 and 154, respectively.

Finally, curve E illustrates that when a large amount of webbing ($L_4$) is withdrawn from retractor 14 and counterspring 58 is highly tensioned, the clutch mechanism will be automatically actuated for limiting the counteractive force generated. At this portion 156 of curve E, a minimum tension force is exerted on safety belt 16 when latched in an operative position. After safety belt 16 has been unbuckled and enough webbing 30 has been retracted to disengage stylus 94 from track 98, counterspring 58 relaxes. This portion 158 is similar for each of curves B-E and reflects the elimination of any counteractive force with only rewind spring 34 acting upon webbing 30. Thus, the tension on webbing 30 increases immediately and Curves B-E conform to Curve A as webbing 30 is further retracted along portion 142 toward the point of beginning 144.

In summary, tension relief mechanism 56 of the present invention allows an occupant to easily adjust the amount of webbing pressure exerted upon their body without the addition of slack into the system. Moreover, the occupant can selectively and incrementally decrease the amount of tension exerted upon webbing 30 by retractor 14. In addition, the design of tension relief mechanism 56 limits the occupant's ability to reduce the tension on webbing 30 below a predetermined minimum value to ensure a "taut" positioning of safety belt 16 against the seat occupant. Thus, tension relief mechanism 56 of the present invention provides a unique and simplified means for manipulating the amount of pressure exerted by safety belt systems upon occupants within a predetermined operating range.

While the above detailed description describes the preferred embodiment of the present invention, the invention is susceptible to modification, variation, and alteration without deviating from the scope and fair meaning of the subjoined claims.

What is claimed is:

1. A safety belt retractor comprising:
   first biasing means for exerting a retractive tensile force on a safety belt webbing such that said belt webbing is urged toward a stored position within said retractor;
   second biasing means for generating a counteractive force in opposition to said retractive force such that a vehicle occupant may vary the magnitude of said counteractive force between a minimum value for establishing a maximum tension on said belt webbing and a maximum value for establishing a minimum tension on said belt webbing;
   clutch means for limiting said maximum value of said counteractive force generated by said second biasing means to inhibit over-loading thereof; and
   actuation means operable in response to the withdrawal of a predetermined length of said belt webbing for selectively causing said counteractive force to be exerted on said belt webbing for reducing the tension exerted thereon by said first biasing means.

2. The safety belt retractor of claim 1 wherein the magnitude of said counteractive force between said minimum and maximum values is proportional to the additional incremental length of said belt webbing withdrawn in excess of said predetermined length.

3. The safety belt retractor of claim 1 further comprising a rotatable spool for storing said safety belt webbing thereon such that said first biasing means is adapted to urge said spool to rotate in a first direction for winding said belt webbing thereon, and said actuation means being operable in an actuated mode for permitting said counteractive force to be exerted on said spool for opposing rotation of said spool in said first direction, said actuation means being further operable in a non-actuated mode for preventing said counteractive force from being exerted on said spool.

4. The safety belt retractor of claim 3 further comprising a first member rotatable with said spool and a second member movable with respect to said first member, said second biasing means comprising a counterspring having a first end fixed to said first member and a second end retained on said second member, said actuation means comprising a follower member that is movable between a first position engaged with said second member and a second position disengaged from said second member, wherein when said actuation means is in said actuated mode said follower is in said first position for inhibiting rotation of said second member in said first direction such that said counterspring is loaded for exerting said counteractive force on said spool, and when said actuation means is in said non-actuated mode said follower is moved to said second position for permitting said second member to rotate concurrently with said spool-driven first member such that said counterspring remains unloaded for inhibiting exertion of said counteractive force on said spool.

5. The safety belt retractor of claim 4 wherein the reduction in tension exerted on said belt webbing when said actuation means is in said actuated mode is proportional to the magnitude of said counteractive force which in turn is proportional to the amount of relative rotation generated between said first and second members.

6. The safety belt retractor of claim 5 wherein said actuation means is normally retained in said non-actuated mode with said follower in said second position, said actuation means being shifted from said non-actuated mode into said actuated mode in response to the withdrawal of a predetermined length of said belt webbing from said spool.

7. The safety belt retractor of claim 6 wherein the amount of relative rotation generated between said first and second members is proportional to the incremental length of additional webbing withdrawn from said spool in excess of said predetermined length.

8. The safety belt retractor of claim 7 wherein said second member includes cam surface means engageable with said follower for permitting said second member to rotate concurrently with said spool-driven first member in a second direction during withdrawal of said incremental length of additional belt webbing, and wherein said cam surface means includes stop means engageable with said follower for inhibiting rotation of said second member in said first direction during subsequent retraction of said incremental length of additional belt webbing for rotation of said spool-driven first member relative to said second member.

9. The safety belt retractor of claim 8 wherein said clutch means is associated with the interconnection between said counterspring and said second member for establishing said maximum counteractive force value which is generated upon the additional length of said webbing exceeding a maximum length.

10. The safety belt retractor of claim 9 wherein said clutch means comprises a dog member extending from said second end of said counterspring for engaging one of a plurality of circumferentially spaced grooves formed in said second member, said dog member adapted to seat within said grooves such that said dog member is maintained in a held relationship with respect to one of said grooves when said counteractive force generated by said counterspring is less than said maximum value, and said dog member being further adapted to disengage said one groove when said maximum value is exceeded by ratcheting over each sequential groove until the loading on said counterspring is less than said maximum value.

11. The safety belt retractor of claim 7 wherein said clutch means is associated with the interconnection between said second end of said counterspring and said second member for limiting said counteractive force to said maximum value to inhibit overloading of said counterspring in response to relative rotation between said first and second members.

12. The safety belt retractor of claim 11 wherein said counteractive force can be varied between said minimum value at which the tension on said belt webbing is substantially equal to said retractive force exerted by said first biasing means, and said maximum value at which the tension on said belt webbing is substantially equal to said retractive force offset by said maximum counteractive force.

13. A safety belt retractor comprising:
a rotatable spool for storing safety belt webbing thereon;
rewind spring means for exerting a retractive force on said spool to exert tension on said safety belt webbing; and
a tension relief mechanism for selectively reducing the tension exerted on said belt webbing by said rewind spring means, said tension relief mechanism having counterspring means for generating a counteractive force in opposition to said retractive force such that a vehicle occupant may vary the magnitude of said counteractive force between a minimum value and a maximum value, and actuation means operable for establishing a non-actuated mode wherein only said retractive force of said rewind spring means is exerted on said spool, and an actuated mode wherein said counteractive force of said counterspring means is applied to said spool in opposition to said retractive force for reducing the tension on said belt webbing in proportion to the magnitude of said counteractive force, and wherein said actuation means is shifted from said non-actuated mode to said actuated mode in response to the withdrawal of a predetermined length of said safety belt.

14. The safety belt retractor of claim 13 wherein withdrawal and subsequent retraction of an additional length of said belt webbing in excess of said predetermined length causes said counterspring means to be loaded for generating said counteractive force such that the reduction in tension exerted on said safety belt webbing is proportional to the magnitude of said counteractive force which in turn is proportional to the length of said additional webbing withdrawn.

15. The safety belt retractor of claim 14 wherein said minimum value for said counteractive force is established when said counterspring means is unloaded such that said maximum tension is substantially equal to said retractive force exerted by said rewind spring means, and wherein said maximum value for said counteractive force is established when said counterspring means is fully loaded such that said minimum tension is substantially equal to said retractive force offset by said counteractive force.

16. The safety belt retractor of claim 15 further comprising clutch means for establishing said fully loaded condition of said counterspring means in response to withdrawal of a maximum additional length of said belt webbing in excess of said predetermined length.

17. The safety belt retractor of claim 14 further comprising means for loading said counterspring means in response to said tension relief mechanism being shifted into said actuated mode, and wherein said means include a first member rotatable with said spool and a second member interconnected to said first member by said counterspring means, said second member being free to rotate with said spool-driven first member during withdrawal of said additional length of belt webbing and inhibited from rotating therewith upon subsequent retraction of said additional length of belt webbing, whereby the relative rotation between said first and second members in response to retraction of said additional belt webbing is operable for loading said counterspring means so as to exert said counteractive force on said spool.

18. The safety belt retractor of claim 17 wherein said actuation means includes a follower that is movable between a first position engaging said second member when said tension relief mechanism is in said actuated mode, and a second position displaced from said second member when said tension relief mechanism is in said non-actuated mode, said actuation means further including means for controlling movement of said follower between said first and second position in response to the length of belt webbing withdrawn from said spool.

19. The safety belt retractor of claim 17 further comprising clutch means provided between said counterspring means and said second member for limiting the magnitude of said counteractive force to a predetermined maximum value.

20. A tension relief mechanism for use with a safety belt retractor of the type having a rotatable spool for storing safety belt webbing thereon and a rewind spring for exerting a retractive force on the belt webbing, said tension relief mechanism comprising:
 a counterspring means for generating a counteractive force in opposition to the retractive force such that a vehicle occupant may vary the magnitude of said counteractive force between a minimum value for establishing a maximum tension on said belt webbing and a maximum value for establishing a minimum tension on said belt webbing; and
 actuation means operable for establishing a non-actuated mode wherein only the retractive force of the rewind spring is exerted on the spool, and an actuated mode wherein said counteractive force of said counterspring means is applied to the spool in opposition to the retractive force for reducing the tension exerted on the belt webbing by the rewind spring, and wherein said actuation means is shifted from said non-actuated mode to said actuated mode in response to a predetermined length of the belt webbing being withdrawn from the spool and said actuation mechanism is shifted from said actuated mode to said non-actuated mode in response to retraction of said predetermined length onto the spool.

21. The tension relief mechanism of claim 20 wherein withdrawal and subsequent retraction of an additional length of the belt webbing causes said counterspring means to be loaded for generating said counteractive force such that a reduction in the tension exerted on the safety belt webbing is proportional to the magnitude of said counteractive force which in turn is proportional to the length of said additional webbing withdrawal in excess of said predetermined length.

22. The tension relief mechanism of claim 21 wherein said minimum value for said counteractive force is established when said counterspring means is unloaded such that said maximum tension is substantially equal to the retractive force exerted by the rewind spring, and wherein said maximum value for said counteractive force is established when said counterspring means is fully loaded such that said minimum tension is substantially equal to the retractive force offset by said counteractive force.

23. The tension relief mechanism of claim 22 further comprising clutch means for establishing said fully loaded condition of said counterspring means in response to withdrawal of a maximum additional length of belt webbing in excess of said predetermined length.

24. The tension relief mechanism of claim 21 further comprising means for loading said counterspring means in response to said tension relief mechanism being shifted into said actuated mode, and wherein said means include a first member rotatable with said spool and a second member interconnected to said first member by said counterspring means, said second member being free to rotate with said spool-driven first member during withdrawal of an additional length of belt webbing and inhibited from rotating therewith upon subsequent retraction of said additional length of belt webbing, whereby the relative rotation between said first and second members in response to retraction of said additional belt webbing is operable for loading said counterspring means so as to exert said counteractive force on the spool.

25. The tension relief mechanism of claim 24 wherein said actuation means comprises a follower that is movable between a first position engaging said second member when said tension relief mechanism is in said actuated mode and a second position displaced from said second member when said tension relief mechanism is in said non-actuated mode.

26. The tension relief mechanism of claim 25 wherein said actuation means further comprises an actuator for shifting said follower between said first and second positions in response to the length of webbing withdrawn from the spool.

27. A tension relief mechanism for use with a safety belt retractor of the type having a rotatable spool and a rewind spring for exerting a retractive force on the spool for winding the safety belt webbing thereon and tensioning the safety belt webbing, said tension relief mechanism comprising:
 a clutch member capable of rotational movement with respect to the spool;
 a counterspring coupling the spool and said clutch member and exerting a counteractive force on the spool to oppose said retractive force in response to relative rotation between the spool and said clutch member such that a seated occupant may vary the magnitude of said counteractive force between a minimum value for establishing a maximum tension on the belt webbing and a maximum value for establishing a maximum tension on the belt webbing; and an actuation mechanism having engaging means moveable between a first position for engaging said clutch member to permit relative rotation between the spool and said clutch member and a second position for disengaging said clutch member to permit concurrent rotation of the spool and said clutch member, said actuation mechanism being operable to position said engaging means between said first and second positions in response to withdrawal of a predetermined length of the safety belt webbing.

28. The tension relief mechanism of claim 27 further comprising overtensioning means for setting said maximum value of said counterspring to prevent overtensioning thereof.

29. The tension relief mechanism of claim 28 wherein said over-tensioning means comprises said counterspring releasably engaging said clutch member such that loading of said counterspring beyond said maximum value causes said counterspring to disengage from and rotate relative to said clutch member.

30. The tension relief mechanism of claim 29 wherein said over-tensioning means further comprises a dog formed on an end of said counterspring and a contoured surface formed on an inner surface of said clutch member for engaging said dog, said contoured surface being operable to prevent said counterspring from disengaging said clutch member until said maximum value is reached.

31. The tension relief mechanism of claim 30 wherein said contoured surface comprises a plurality of grooves separated by a plurality of lands thereby defining a continuous tooth-like surface.

32. The tension relief mechanism of claim 27 further comprising braking means for impeding the rate at which said counteractive force is released upon disengagement of said engaging means.

33. The tension relief mechanism of claim 32 wherein said braking means comprises a brake pad engaging said counterspring as said counterspring is released from a tensioned state to an untensioned state.

34. The tension relief mechanism of claim 33 wherein said counterspring comprises a coiled spring and said brake pad is interleaved within an intermediate portion of said coiled spring.

35. The tension relief mechanism of claim 34 further comprising a drive member fixed for rotation with the spool and interdisposed between the spool and said clutch member, said counterspring coupling the spool and said clutch member via said drive member, and wherein said brake pad is formed in said drive member and generally following the shape of said coiled spring.

36. The tension relief mechanism of claim 34 wherein said brake pad comprises a flexible metal band generally following the shape of said coiled spring and interleaved therebetween.

37. The tension relief mechanism of claim 27 wherein said clutch member further comprises a camming surface formed on a face of said clutch member opposite the spool such that said engaging means engages said camming surface for causing relative rotation between the spool and said clutch member.

38. The tension relief mechanism of claim 37 wherein said camming surface comprises a recessed annular channel and a plurality of detents formed in said annular channel, and wherein said engaging means comprises a follower extending into said annular channel and capable of engaging said plurality of detents.

39. The tension relief mechanism of claim 38 wherein each of said plurality of detents further comprise a ramped surface transitioning from said annular channel to a bottom of each of said plurality of detents for enabling said follower to temporarily disengage from said clutch member to provide concurrent rotation with said the spool when the safety belt webbing is further protracted and engage said clutch member to provide relative rotation with the spool when the safety belt webbing is subsequently retracted.

40. The tension relief mechanism of claim 38 wherein said follower comprises a spring-biased stylus normally biased towards said clutch member and into said annular recessed channel for engaging said clutch member, and wherein said actuation means opposes said spring-biased stylus for disengaging said clutch member.

* * * * *